United States Patent [19]

Weltsch

[11] Patent Number: 5,038,816
[45] Date of Patent: Aug. 13, 1991

[54] DRAIN PIPE TRAP

[76] Inventor: Judy Weltsch, 430 N. Maple Dr., Beverly Hills, Calif. 90210

[21] Appl. No.: 528,598

[22] Filed: May 24, 1990

[51] Int. Cl.⁵ .............................................. F16L 55/24
[52] U.S. Cl. .......................... 137/247.51; 4/DIG. 14
[58] Field of Search ................... 4/DIG. 14, 255–257, 4/206–207, 191, 197, 286, 292; 137/247.51, 247.41, 247.43

[56] References Cited

U.S. PATENT DOCUMENTS

| | | | |
|---|---|---|---|
| 976,593 | 11/1910 | Newsome | 4/255 |
| 3,935,602 | 2/1976 | Kale | 4/DIG. 14 X |
| 4,164,048 | 8/1979 | Kampfer et al. | 4/DIG. 14 X |
| 4,179,762 | 12/1979 | Barnhardt et al. | 4/DIG. 14 X |
| 4,230,582 | 10/1980 | Tuleja | 137/247.51 X |
| 4,301,554 | 11/1981 | Wojcicki | 4/255 X |
| 4,700,412 | 10/1987 | Manuel | 137/247.51 X |

FOREIGN PATENT DOCUMENTS 2756243  7/1979  Fed. Rep. of Germany ... 4/DIG. 14

Primary Examiner—Henry J. Recla
Assistant Examiner—Robert M. Fetsuga
Attorney, Agent, or Firm—Marvin H. Kleinberg

[57] ABSTRACT

A removable drain trap assembly comprised of a clear plastic curved pipe member, a removable bottom closure member attached to the dip portion of the pipe member, and a gridlike member placed vertically within the dip portion of the bottom closure member. The gridlike member is placed along the vertical cross section of the assembly having maximum fluid flux to maximize object capture capacity. The gridlike member conforms to the cross sectional width of the dip portion and the bottom closure member to minimize fluid flow impedance. The bottom closure member is elongated and deepened to facilitate retention of smaller foreign objects which might pass through the gridlike member.

12 Claims, 3 Drawing Sheets

DRAIN PIPE TRAP

BACKGROUND OF THE INVENTION

1. Field of the Invention

This invention relates to traps for drain pipes, and more particularly, to removable traps placed at the bottom of sink pipes.

2. Background Art

In order to maintain unobstructed fluid flow through drain pipes, drain pipe traps have been used to catch hair and other foreign materials which might otherwise clog the pipeline. Various forms of drain pipe traps have evolved over the years in which devices designed to catch foreign matter are placed somewhere along the pipeline. These various traps have all suffered from limitations in their ability to trap the maximum amount of foreign matter while minimizing the impairment of fluid flow. Furthermore, most of these drain traps require a housecall by a plumber for maintainence.

An improved, removable drain pipe trap was disclosed and claimed in U.S. Pat. No. 3,935,602, issued to Kale. Kale provided a clear plastic trap with a removable closure placed at the bottom of the dip portion of the trap. The trap has a plurality of fingers to prevent the passage of foreign objects. However, while the fingers provide for the capture of random particles, much of the foreign matter will evade the fingers since the fluid flow is at a maximum at the dip portion of the drain pipe.

SUMMARY OF THE INVENTION

What is needed and what is provided by the present invention is a drain pipe trap which captures the maximum amount of foreign matter without unduly impeding the flow of fluid through the pipeline and which is easily opened for cleaning. The drain pipe trap has a screen which is placed vertically within the drain pipe trap. The screen is a gridlike structure and is placed at the bottom of the dip of the drain pipe trap at the point of maximum fluid flow volume, thus maximizing its trapping capacity. Moreover, the removable closure is a deep cup which provides an extended path for foreign objects so that gravity traps those smaller objects which pass the screen. The vertical placement of the gridlike trap screen along the entire cross section of the drain pipe dip allows for the maintainence of a relatively constant fluid velocity at every point along the height of the gridlike screen, thus minimizing the impedance of fluid flow.

DETAILED DESCRIPTION OF THE DRAWINGS

Figure 1:
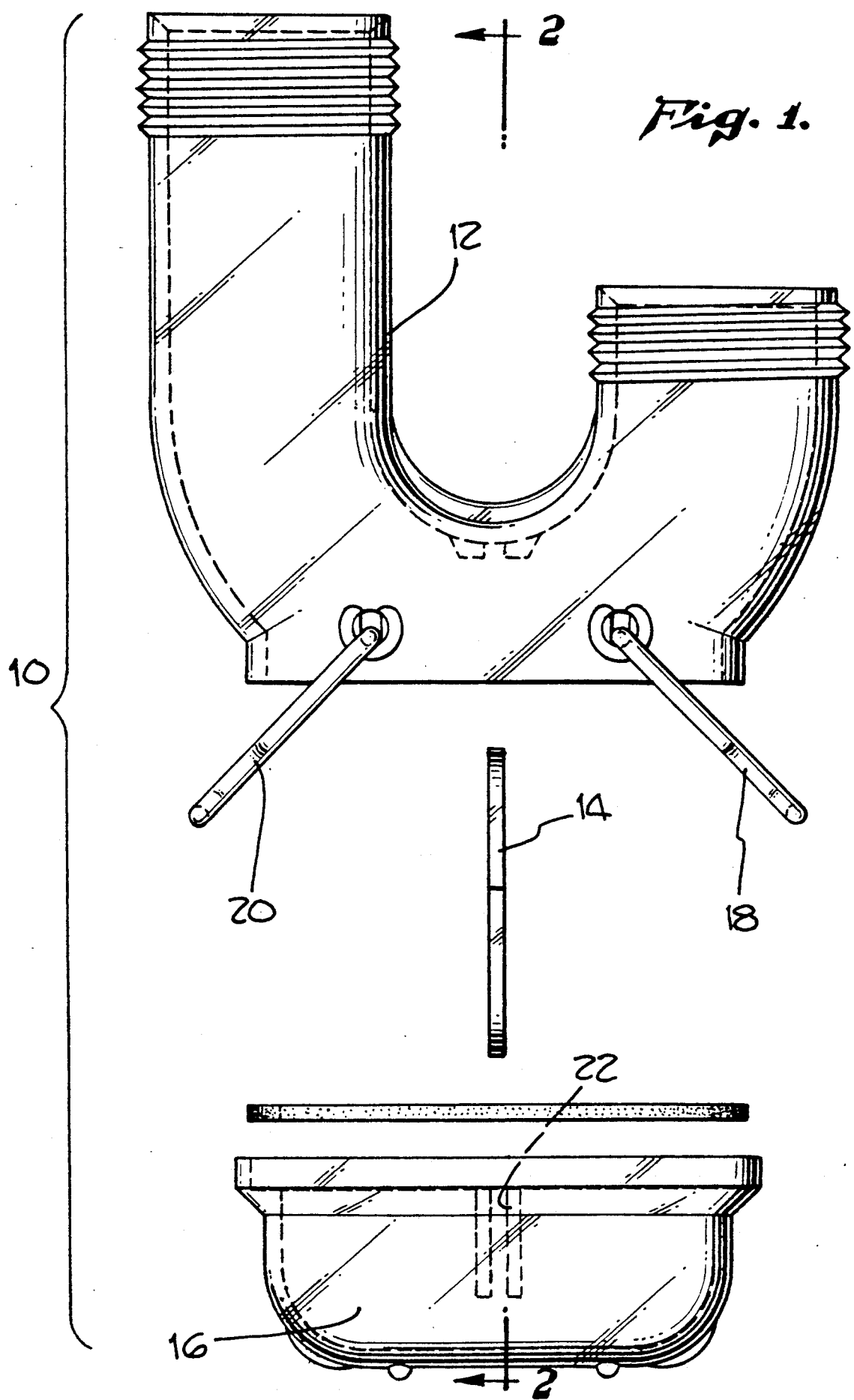
FIG. 1 is an exploded side view of the drain trap assembly of the invention.

FIG. 1 shows an exploded side view of the preferred embodiment of the drain pipe trap of the present invention. Drain trap assembly 10 is preferably made of a clear plastic and consists of curved pipe member 12, drain trap grid member 14, and removable trap member 16. The removable trap member 16 attaches to the bottom of pipe member 12 forming an integral pipe assembly. The removable trap member 16 in the preferred embodiment, is attached to pipe member 10 by a pair of "U" shaped ring clips 18 and 20 which extend from the bottom of pipe member 10 and fit over the bottom of trap member 16. An integral slot 22 is molded into the interior trap member 16 to retain the grid member 14 in place.

Figure 2:
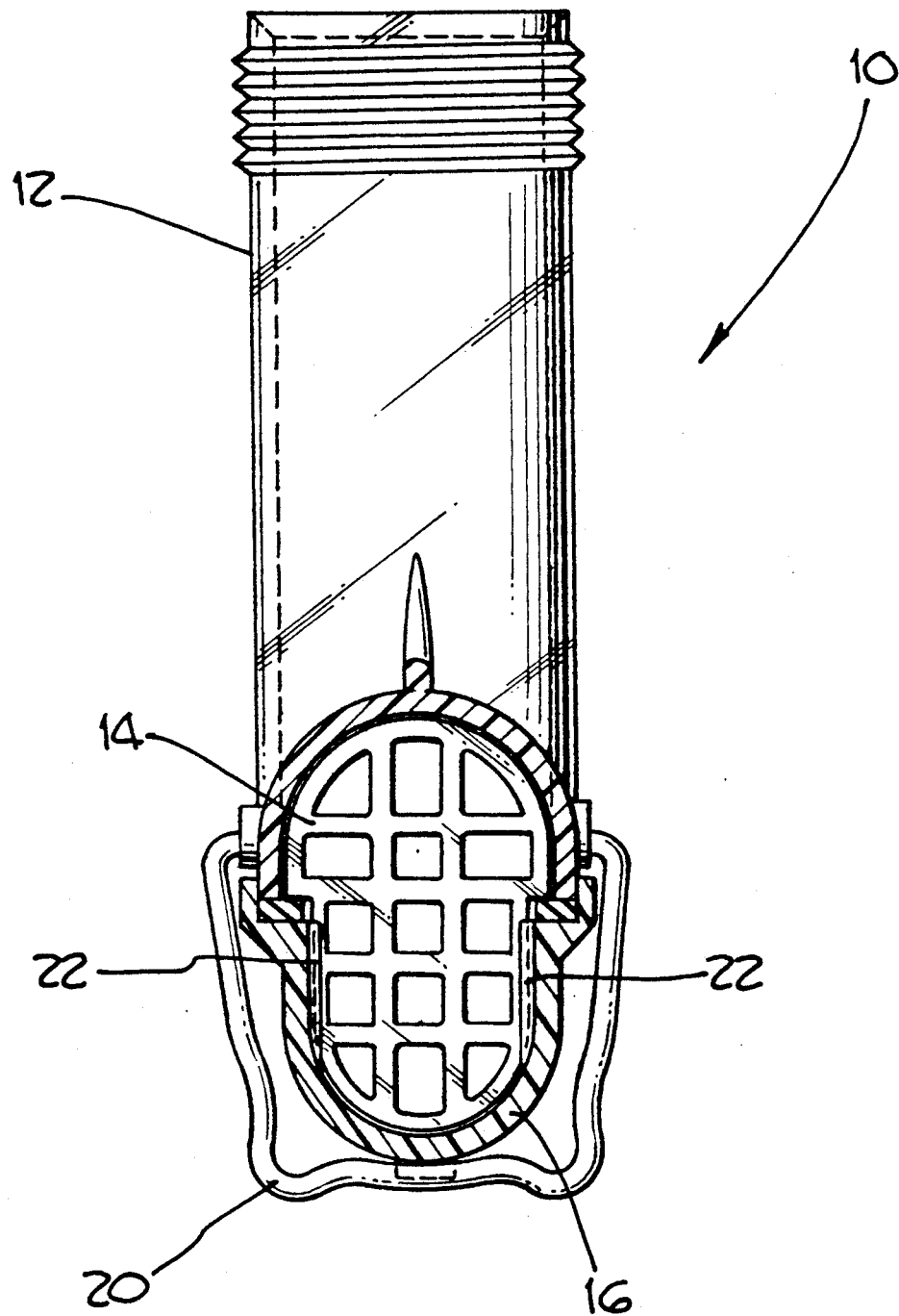
FIG. 2 is a cross sectional view of the drain trap assembly taken along line 2—2 of FIG. 1.

FIG. 2 shows a cross section of the integral pipe assembly 10 taken along the lines shown in FIG. 1. As shown by FIG. 2, drain trap grid 14 sits vertically in trap member 16 supported by the slot 22. When pipe member 12 is attached to trap member 16, grid member 14 fits within the entire vertical cross section of the bottommost portion of the integral pipe assembly. The width of trap member 16 is narrower than that of pipe member 12 and grid member 14 has a a corresponding variation in its width to conform to the the widths of both trap member 16 and pipe member 12.

Figure 3:
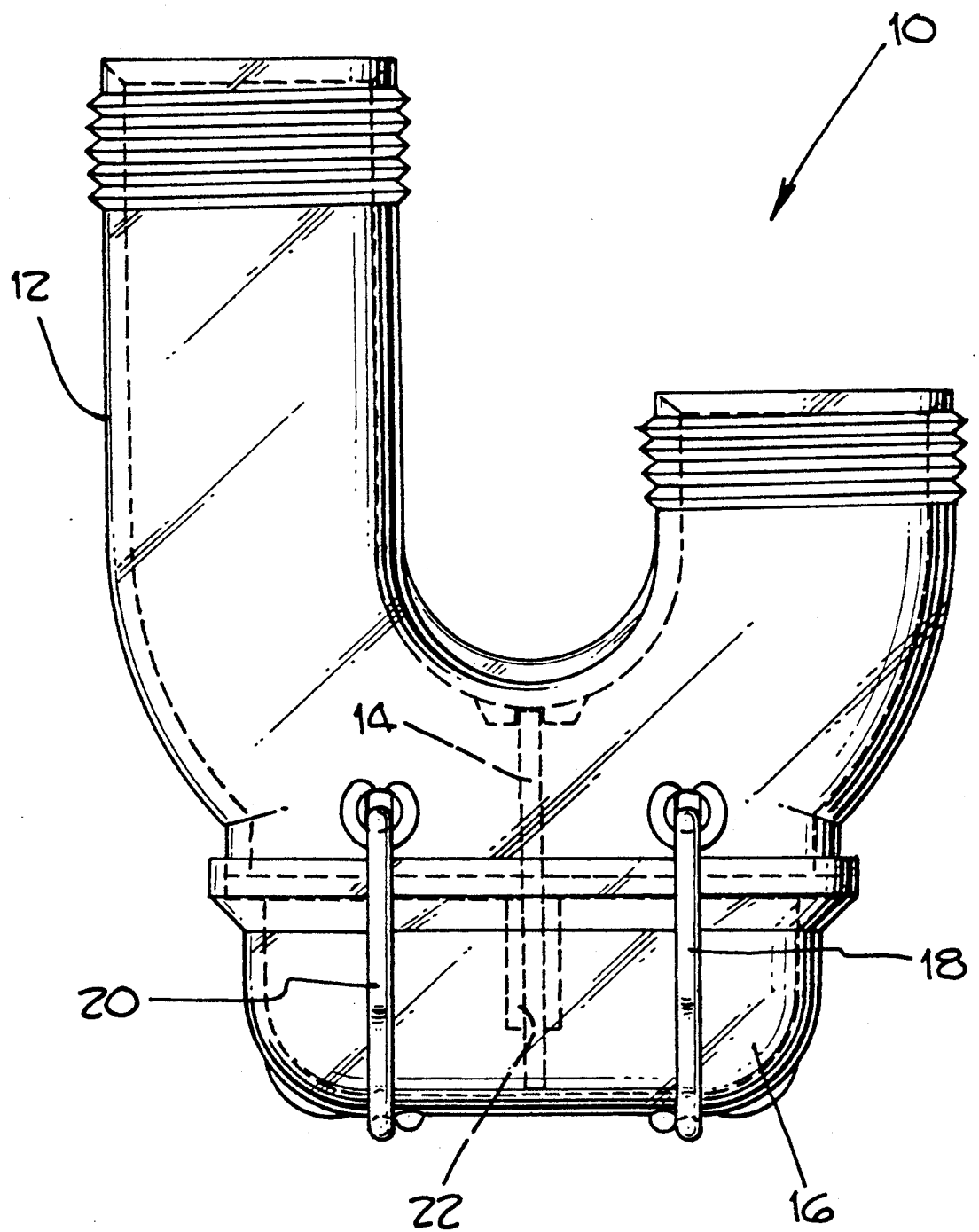
FIG. 3 is a side view of the fully assembled drain trap assembly.

The placement of grid member 14 along the vertical cross section of the center of the arcuate portion of the drain trap assembly 10 serves the dual function of maximizing trapping capacity as well as minimizing fluid impedance. As shown in FIG. 3, when the drain trap assembly 10 is fully assembled, grid member 14 sits in slot 22 in the center of trap member 16. Grid member 14 runs vertically from slot 22 and terminates at the upper surface of the center of the arcuate portion of curved pipe member 12. Thus, grid member 14 runs vertically along the entire cross section of pipe member 12 where the fluid flux is at a maximum and therefore has the greatest opportunity to encounter and trap foreign objects.

Furthermore, since grid member 14 conforms to both the width of pipe member 12 and the width of trap member 16, impedance of fluid flow is uniform throughout the cross section.

Returning to FIG. 2, trap member 16 is designed to be narrower in width than pipe member 12. Thus, a greater fluid volume flows more slowly through the upper, wider portion of grid member 14 through pipe member 12. Trap member 16 is also designed to be deeper than pipe member 12 would be alone. This larger "trap area" at the bottom of trap member 16 combined with the slower flow enables gravitational forces to more readily draw foreign objects which pass the screen out of the main flow path and down into the bottom of trap member 16.

Because the trap assembly is transparent, obstructions and foreign objects can be seen. These are thus easily removed by removal of trap member 16 from assembly 10. What is thus provided is a removable trap assembly that maximizes trapping capacity while minimizing fluid flow impedance.

Changes and modifications in the specifically described embodiment can be carried out without departing from the scope of the invention, which is intended to be limited only by the scope of the appended claims.

What is claimed is:

1. A waste drain pipe trap comprising:
   (a) a curved pipe member having a first end and a second end and a dip member having a first end and a second end and a dip portion therebetween, said pipe member adapted to be placed intermediate a drain pipe line, said first end adapted to be attached to said drain pipe line to receive fluid flow and said second end adapted to be attached to said drain pipe line to deliver said fluid to said pipe line and said dip portion having an opening thereacross;

(b) blocking means adapted to be placed along a vertical cross section of said dip portion of said pipe member, said blocking means comprised of a grid-like screen adapted to interrupt foreign matter in the fluid flowing therethrough, said blocking means having substantially vertical opposing side edges;

(c) a bottom closure member for closing said dip portion opening, including channel means for supporting said blocking means along said side edges thereof; and (d) locking means for removably attaching said bottom closure member and said blocking means to said curved pipe member.

2. The waste drain pipe trap of claim 1, wherein said vertical cross section comprises the planar cross section of said pipe member having the maximum volume of fluid flowing therethrough.

3. The waste drain pipe trap of claim 1, wherein said locking means include a pair of "U" shaped clips extending from said curved pipe member and adapted to engage and disengage said bottom closure member.

4. The waste drain pipe trap of claim 1, wherein said waste drain trap is made of a transparent material so that foreign objects trapped in said bottom closure member can be seen.

5. The waste drain pipe trap of claim 1 wherein said bottom closure member has an elongated deep cup shaped to provide a reservoir for holding foreign objects held by said blocking means.

6. The waste drain pipe trap of claim 5 wherein said bottom closure member is narrower and substantially deeper than said curved pipe member to provide a reservoir for holding foreign objects which pass said blocking means from the main flow path of said curved pipe member down into said reservoir.

7. The waste drain pipe trap of claim 5, wherein said waste drain trap is transparent to permit observation of foreign objects held therein.

8. A waste drain pipe trap comprising:
(a) a conduit having an inlet end, an outlet end, and a dip portion therebetween with a bottom opening thereinto;
(b) a bottom closure member for closing said opening;
(c) a blocking member comprising a vertical grid having substantially vertical opposing side edges, said blocking member side edges being mounted in substantially vertical channels in said bottom closure member so that said blocking member is positioned along a vertical cross section of said dip portion when said bottom closure member closes said opening; and
(d) means for detachably securing said bottom closure member to said dip portion of said conduit.

9. The waste drain pipe trap of claim 8, wherein said vertical cross section comprises the planar cross section of said conduit having the maximum volume of fluid flowing therethrough.

10. The waste drain pipe trap of claim 8, wherein said means for detachably securing said bottom closure member further includes a pair of "U" shaped clips extending from said conduit and adapted to engage and disengage said bottom closure member.

11. The waste drain pipe trap of claim 8 wherein said bottom closure member has an elongated deep cup shape to provide a reservoir for holding foreign objects held by said blocking member.

12. The waste drain pipe trap of claim 11 wherein said bottom closure member is narrower and deeper than said conduit to providing a reservoir for holding foreign objects which pass said blocking member from the main flow path of said dip portion down into said reservoir.

* * * * *